(No Model.)
S. C. DAVIS.
ASH SIFTER.
No. 557,363. Patented Mar. 31, 1896.
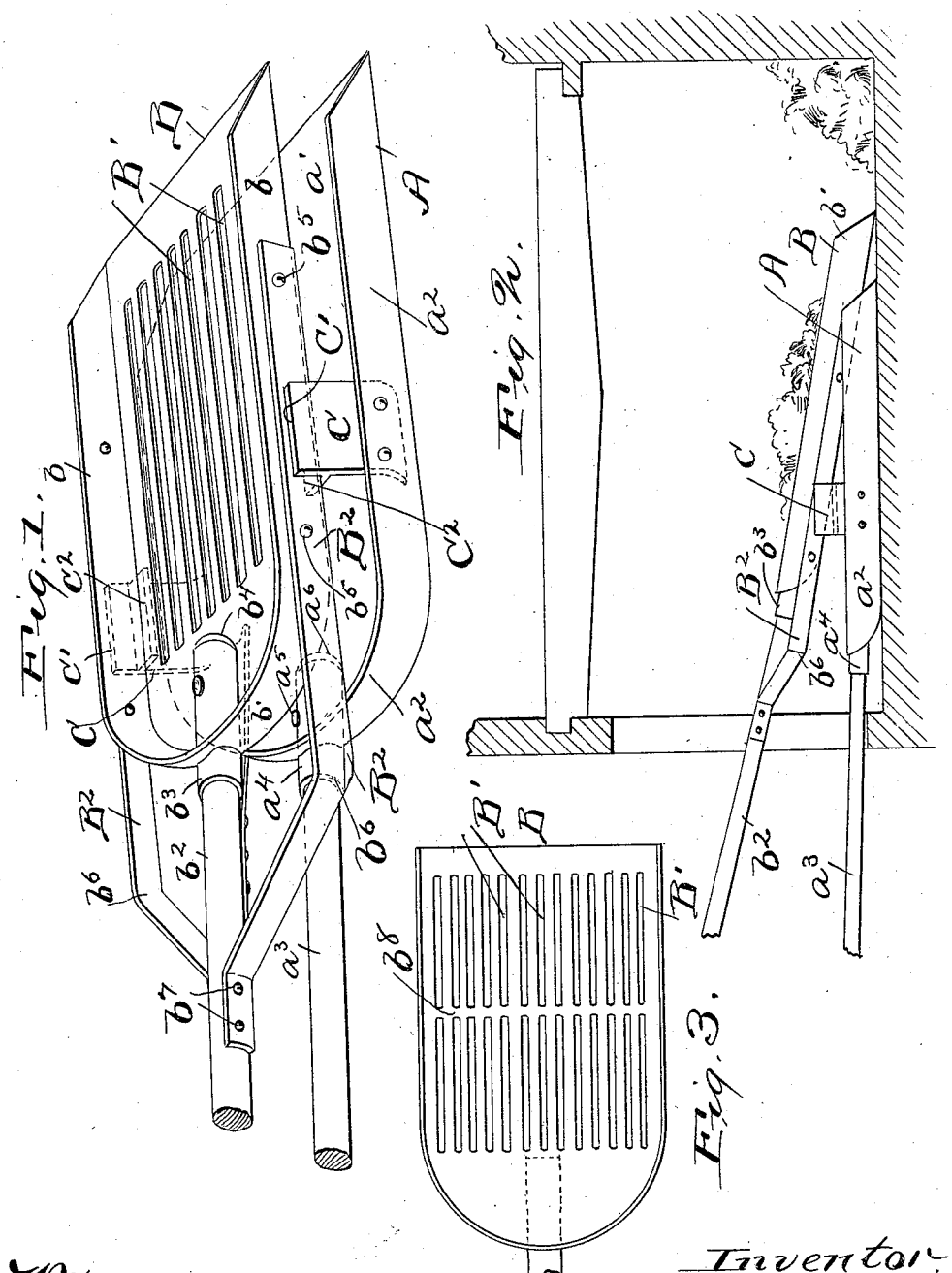

UNITED STATES PATENT OFFICE.

SIMEON C. DAVIS, OF CLEVELAND, OHIO.

ASH-SIFTER.

SPECIFICATION forming part of Letters Patent No. 557,363, dated March 31, 1896.

Application filed December 2, 1895. Serial No. 570,818. (No model.)

*To all whom it may concern:*

Be it known that I, SIMEON C. DAVIS, of Cleveland, Cuyahoga county, Ohio, have invented certain new and useful Improvements in Ash-Sifters; and I do hereby declare the following to be a full, clear, and exact description of the invention, such as will enable others skilled in the art to which it pertains to make and use the same.

My invention relates to ash-sifters; and its object is to provide a simple, yet effective, apparatus for separating the coke, unburned coal, and large cinders from ashes.

With this object in view my invention consists in certain novel combinations of parts and peculiar features of construction, as hereinafter more fully described and claimed.

Reference is to be had to the drawings which accompany and form a part of this specification, in which—

Figure 1 is a view in perspective of my improved sifter. Fig. 2 represents a side elevation and illustrates the sifter when used for sifting the ashes in a furnace-vault. Fig. 3 represents a plan view of the open-work bottom in the sifter-scoop.

Similar letters refer to corresponding parts in all the views.

In the drawings, A represents an ash-scoop, of sheet or plate metal, with an imperforate bottom $a'$, raised at the sides and at one end $a^2$ and provided with a handle $a^3$, projecting through the raised end and within the scoop. That part of the handle within the scoop is provided with the ferrule $a^4$ and is secured to the scoop by means of a rivet, bolt, or screw, which passes through the ferrule and handle and is properly fastened to the bottom of the scoop. The ferrule $a^4$ may also extend along the handle a short distance beyond the rear end of the scoop, thus protecting the lower part of the handle from fire. As a further protection, I may drive into the end of the handle a large-headed tack $a^6$, which forms a closed end for the ferrule and prevents the end of the handle from being burned.

Attached to each side of the scoop are upwardly-projecting pieces of metal C, forming the vertical ledge $C'$ and the lateral ledge $C^2$, which serve as guides for the sifter scoop or track $B^2$, secured to the sifter-scoop, as hereinafter more fully described.

In the drawings, B represents an ash sifter or scoop provided with an open-work bottom $B'$. The sifter is also provided with raised sides $b$ and end $b'$, a handle $b^2$, which is protected by the ferrule $b^3$ and the large-headed tack $b^4$, said handle being secured to the sifter B in a manner similar to and substantially the same as described in scoop A.

Attached to the sides of sifter B are braces $B^2$, secured by means of the bolt, screw, or rivet $b^5$, and which extends beyond the rear end, preferably parallel to the sides of the sifter, for a suitable distance. Said braces are then bent, as at $b^6$, and fastened to the handle at any point, as at $b^7$. The braces are made of iron bars, or of similar material, and constitute a track or runners adapted to fit and reciprocate on the ledges $C'$ and $C^2$, hereinbefore described.

In Fig. 3 I represent another design for the open-work bottom $B'$, in which is shown the web $b^8$ for the purpose of strengthening said bottom. I may use a thin bar of metal extending from side to side for the purpose of supporting the bottom, instead of the web, as shown.

The operation of my ash-sifter is very simple and is as follows: The sifter B is first filled with ashes, coke, cinders, &c., by inserting it into the ash pit or vault. The scoop A is then shifted underneath the sifter B, which is reciprocated upon and guided by the ledges $C'$ and $C^2$. The ashes are thus sifted into scoop A, while the coke and unburned coal remains in the sifter B. Thus the ashes can be removed and the unburned coal returned to the furnace without further handling. Inasmuch as the sifting is all done underneath the furnace and in the ash-pit, the dust is drawn up through the furnace, and thus not allowed to float through the room.

In my invention neither scoop is provided with any appliance that will prevent its use for other purposes than the one for which it was designed. The ledges $C'$ and $C^2$ will not prevent the scoop A from being used when necessary as an ordinary scoop or shovel. The sifter B, provided with an open-work bottom, can be adapted to a variety of purposes. In combination, however, the scoop A and sifter B form a new and useful article of manufacture, easy of manipulation and simple and effective in operation.

I may, if I desire, form a shoe or brace extending centrally underneath the scoop B and along the handle, as shown in dotted lines, Figs. 1 and 3, so that the sifter may be used over a tank, barrel, or other container without wearing the handle or bottom of the scoop.

What I claim is—

1. An ash-sifter composed of a scoop having an open-work bottom and a suitable handle, said scoop being provided with braces substantially as shown, which extend along the sides of the same and form the runners on which said scoop may be reciprocated, substantially as described.

2. In an ash-sifter, the combination of two scoops, one having an imperforate bottom and a suitable handle, said scoop being provided with upwardly and inwardly projecting pieces, arranged to form guides, upon which the other or ash-sifter scoop may be reciprocated, substantially as described.

3. In an ash-sifter, the combination of two scoops, one provided with an open-work bottom and braces to act as runners; the other with imperforate bottom and guides, so arranged that one may reciprocate upon the other, substantially as described.

4. In an ash-sifter, the combination of two scoops, one having an open-work bottom and a suitable handle, said scoop being provided with a track or runners attached to the sides and extending beyond the rear end and parallel to the sides of said ash-sifter scoop for a suitable distance, then being bent and attached to the handle as a means of reciprocating said scoop upon the other scoop, substantially as described.

5. In an ash-sifter, the combination of two scoops, one having an imperforate bottom and a suitable handle, said scoop being provided, on each side and back of the central portion, with upwardly-projecting pieces provided with vertical and lateral ledges, arranged to form guides upon which the ash-sifter scoop may be reciprocated, substantially as described.

6. In an ash-sifter, the combination of two scoops, one provided with a track or runners extending a suitable distance beyond the rear end and parallel to the sides of said ash-sifter scoop; the other with an imperforate bottom and upwardly-projecting pieces provided with vertical and lateral ledges for the purpose of forming guides, so arranged that the ash-sifter scoop may be reciprocated upon said guides, substantially as described.

In testimony whereof I sign this specification, in the presence of two witnesses, this 23d day of November, 1895.

SIMEON C. DAVIS.

Witnesses:
W. E. DONNELLY,
ELLA E. TILDEN.